United States Patent

[11] 3,597,546

[72] Inventor Scott R. Zehr
Fisher, Ill.
[21] Appl. No. 666,904
[22] Filed Sept. 11, 1967
[45] Patented Aug. 3, 1971
[73] Assignee The Magnavox Company
Fort Wayne, Ind.

[54] ACOUSTICAL COUPLING SYSTEM FOR DATA COMMUNICATION EQUIPMENT
3 Claims, 6 Drawing Figs.

[52] U.S. Cl. .......... 179/2, 179/1
[51] Int. Cl. .......... H04m 11/06
[50] Field of Search .......... 179/2 A, 2 DP, 1 C, 2 C, 2 R, 6 R, 3, 4, 2 TV; 340/172.5

[56] References Cited
UNITED STATES PATENTS

| | | | |
|---|---|---|---|
| 3,351,919 | 11/1967 | Milford | 179/2 |
| 3,304,500 | 2/1967 | Likel | 179/2 |
| 3,156,771 | 11/1964 | Vaughn | 179/1 |
| 3,226,480 | 12/1965 | Wright | 179/15 |

OTHER REFERENCES
IBM Technical Disclosure Bulletin, Vol. 5, No. 11, April 1963, pg. 73.
IBM Technical Disclosure Bulletin, Vol. 5, No. 3, August 1962, pg. 52.

*Primary Examiner*—Kathleen H. Claffy
*Assistant Examiner*—Tom D'Amico
*Attorney*—Richard T. Seeger

ABSTRACT: An acoustical coupling system is connected to data communication equipment to provide acoustical coupling to an ordinary telephone handset. The coupling system has a modulator and a demodulator. Gating means are provided to render the modulator and demodulator operative when the telephone handset is positioned for acoustical coupling to the system.

INVENTOR.
SCOTT R. ZEHR

BY *Jeffers and Young*
ATTORNEYS

INVENTOR.
SCOTT R. ZEHR
BY
Jeffers and Young
ATTORNEYS

INVENTOR.
SCOTT R. ZEHR

BY
Jeffers and Young
ATTORNEYS

INVENTOR.
SCOTT R. ZEHR

BY
Jeffers and Young
ATTORNEYS

INVENTOR.
SCOTT R. ZEHR

BY
Jeffers and Young
ATTORNEYS

ACOUSTICAL COUPLING SYSTEM FOR DATA COMMUNICATION EQUIPMENT

BACKGROUND OF THE INVENTION

My invention relates to an acoustical coupling system for data communication equipment, and particularly to an acoustical coupling system that can couple data communication equipment to an ordinary telephone handset without wiring between the system and the handset.

With the increased use of information and data in written form, data communication equipment is being used more and more. This data communication equipment provides means for obtaining information, such as by reading stored information, at one location and producing electrical signals which are transmitted to a second location. At the second location, these electrical signals are applied to data communication equipment which utilizes or reproduces the information at the second location. The signals are usually transmitted over telephone lines or circuits which have been more or less permanently wired to the data communication equipment at the two locations. Such more or less permanent wiring has restricted the usefulness of the data communication equipment, because the ordinary user could not disconnect his equipment and reconnect it for use at a different location.

Accordingly, an object of my invention is to provide an acoustical coupling system which can be easily connected to data communication equipment, and which provides an operative acoustical coupling to an ordinary telephone handset.

Another object of my invention is to provide an acoustical coupling system which, when connected to data communication equipment, permits the equipment to be used with any telephone handset without wiring connected to the handset.

Another object of my invention is to provide a system for connection to data communication equipment so that the equipment may be easily and quickly used with an ordinary telephone handset, thus connecting the equipment to any other telephone handset and data communication equipment through the existing telephone network.

Another object of my invention is to provide an acoustical coupling system that permits data communication equipment to be acoustically coupled to any telephone handset by a relatively unskilled person.

My acoustical coupling system permits data communication equipment to be coupled to an ordinary telephone handset by a relatively unskilled person. Therefore, it is desirable, if not essential, that the acoustical coupling system prevent operation of the data communication equipment until a proper and operable coupling has been made with the data communication equipment at a remote location.

Accordingly, another object of my invention is to provide an acoustical coupling system for data communication equipment that prevents operation of the data communication equipment until a proper coupling or connection has been made with data communication equipment at a remote location.

An ordinary telephone handset has some feedback between the mouthpiece and the earpiece. This handset may be used with data communication equipment that uses a low frequency signal to transmit and a high frequency signal to receive so that transmitting and receiving may take place at the same time. The transmitted signals over the data communication equipment are generally stronger than the received signals, and the higher harmonic frequencies of the transmitted signals may be fed back to the earpiece and interfere with or distort the received signals.

Accordingly, another object of my invention is to provide an acoustical coupling system that has a high frequency passband characteristic which suppresses certain frequencies so that the high frequency signals are not interfered with or distorted by higher harmonic frequencies of the low frequency signals.

SUMMARY OF THE INVENTION

Briefly, these and other objects are achieved in accordance with my invention by an acoustical coupling system having a system input and a system output adapted to be connected to data communication information output and input respectively. The system further includes an input and output to provide acoustical coupling to a telephone handset. A demodulator has its input connected to the acoustical input and an output connected to the system output. First gating means are connected to the demodulator to render the demodulator operative in response to the telephone handset being positioned on the acoustical coupling. A modulator has its input connected to the system input and its output connected to the acoustical output. Second gating means are connected to the modulator to render the modulator operative in response to the telephone handset being positioned on the acoustical coupling. The acoustical coupling system also includes means to prevent harmonics from feeding back into the system and causing improper operation.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1A:
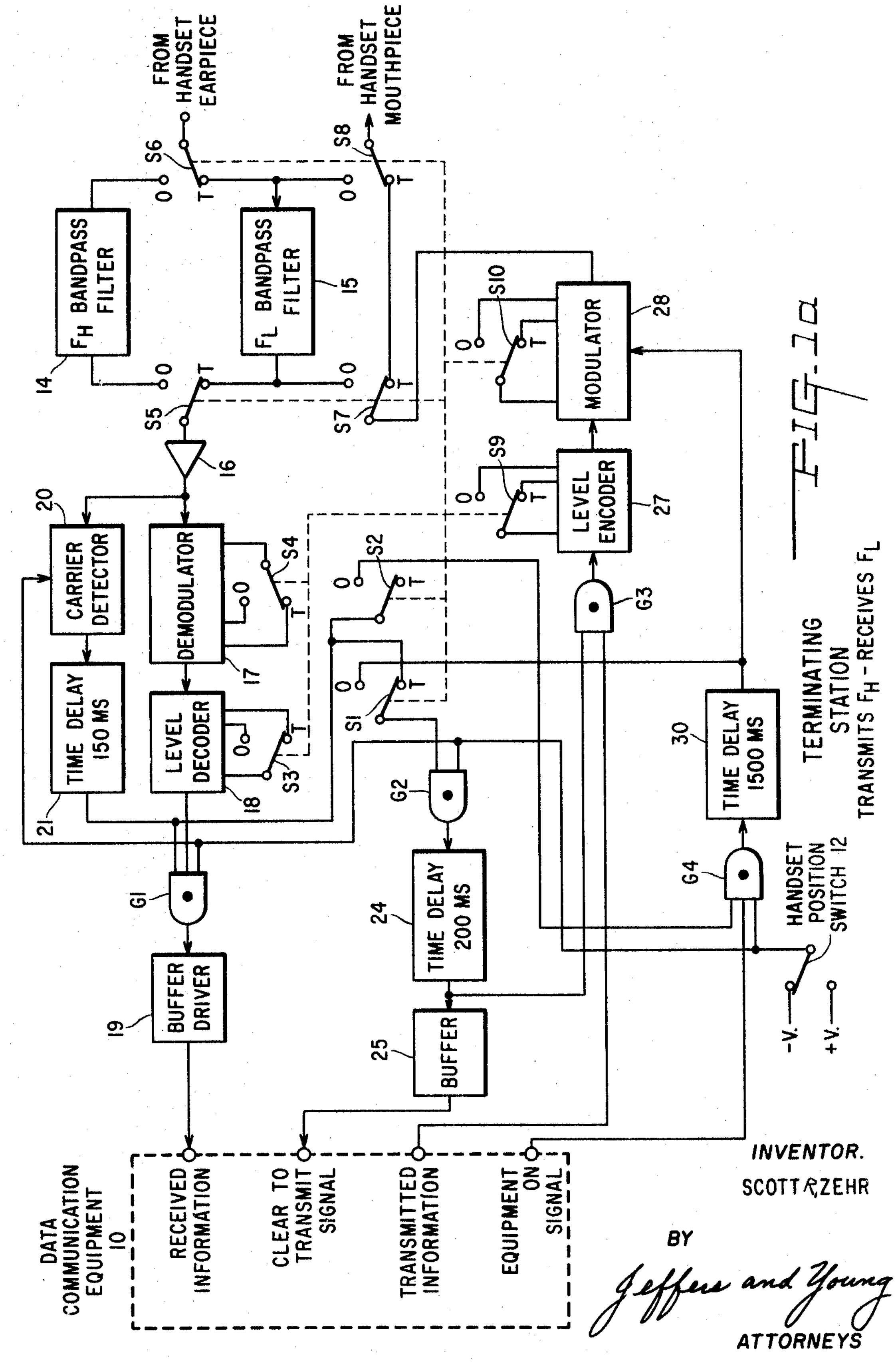
FIGS. 1*a*, 1*b*, and 1*c* show an electrical block diagram of a preferred embodiment of my invention.
Figure 1B:
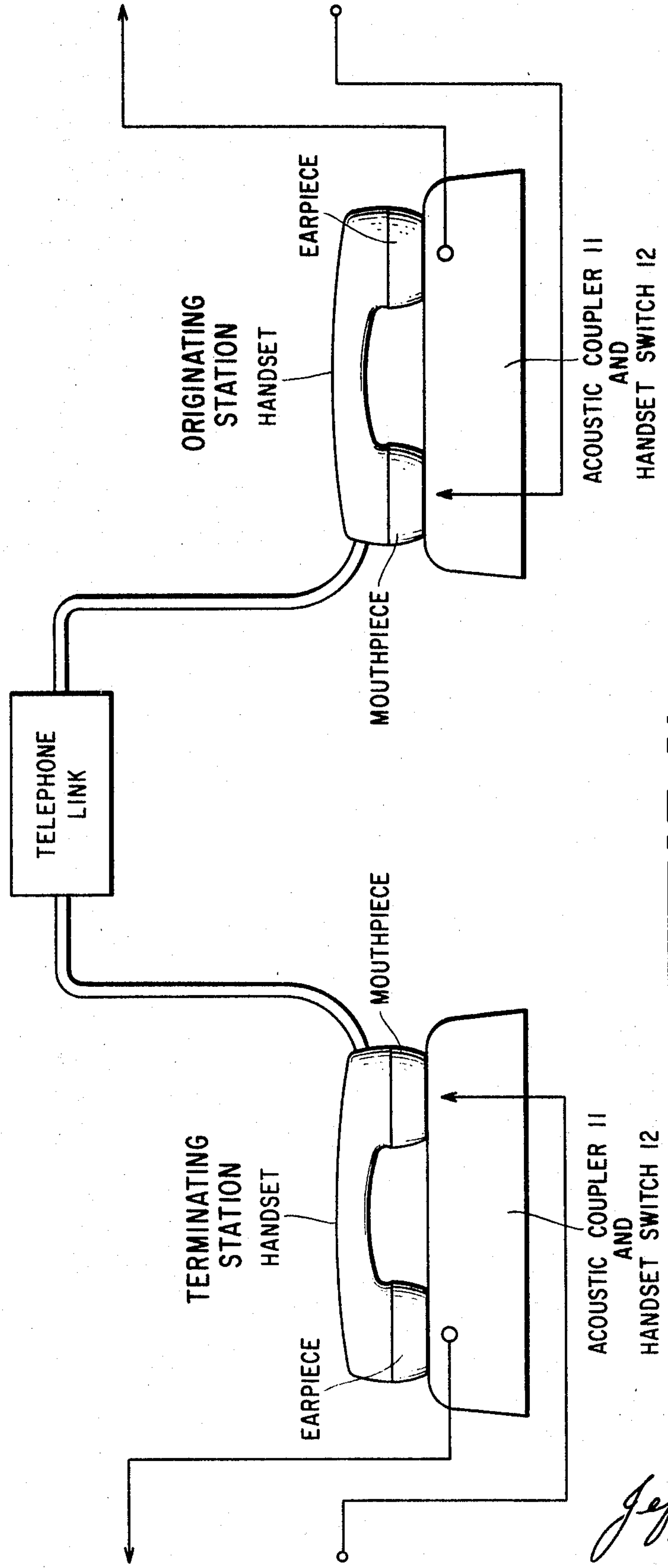
Figure 1C:
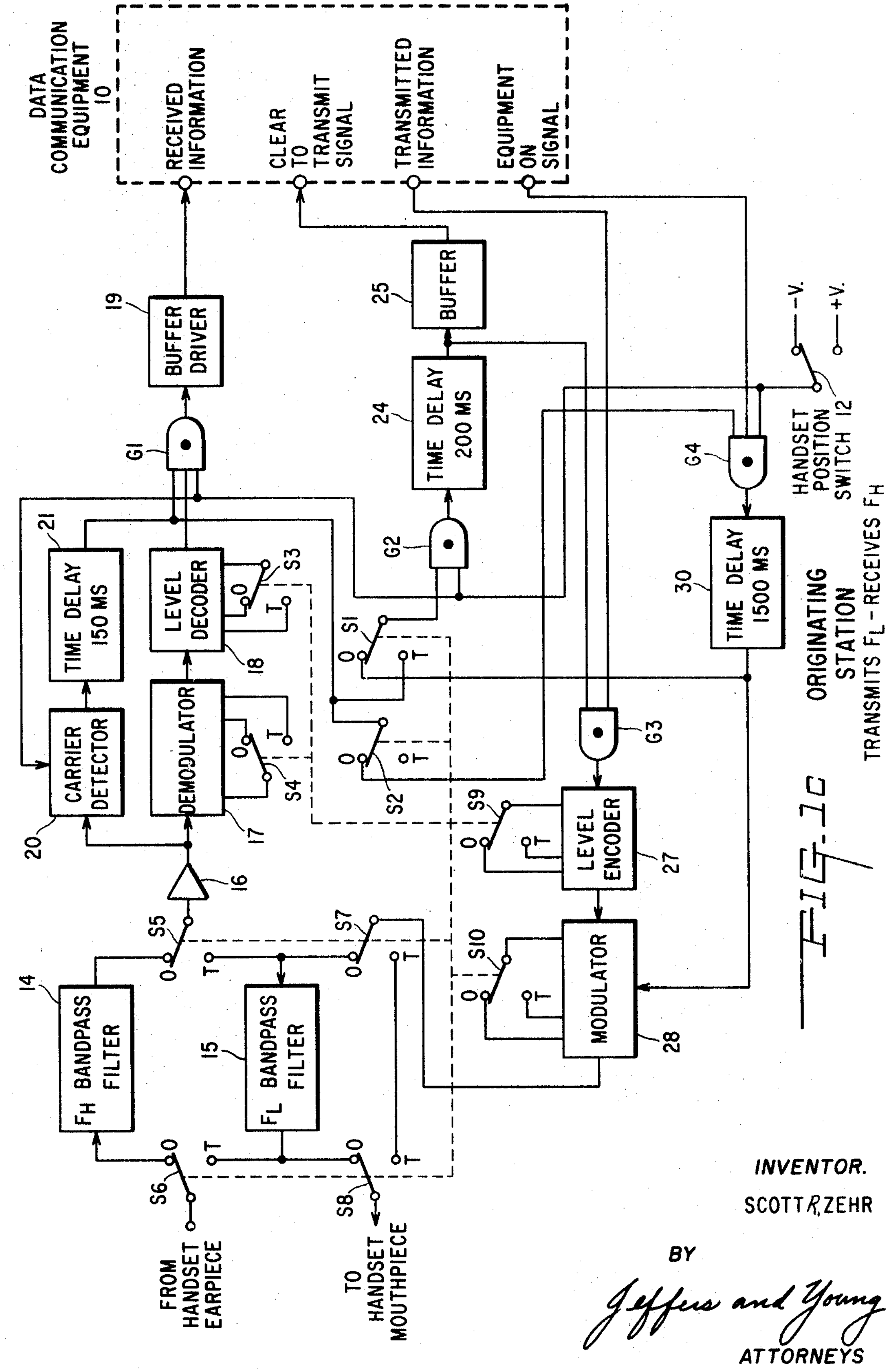

A preferred embodiment of my invention is shown in FIGS. 1*a*, 1*b*, and 1*c*. These figures show my acoustical coupling system utilized with a data communication system having an originating station and data communication equipment shown in FIG. 1*c*; an acoustic coupler and handset switch for the originating station shown in FIG. 1*b*; a telephone link between telephone handsets at the originating station and the terminating station also shown in FIG. 1*b*; an acoustic coupler and handset switch for the terminating station shown in FIG. 1*b*; and a terminating station and data communication equipment shown in FIG. 1*a*. The figures should be considered together with FIG. 1*a* at the left, FIG. 1*b* to the right of FIG. 1*a*, and FIG. 1*c* to the right of FIG. 1*b*.

Since I have shown two acoustical coupling systems, one for a terminating station and one for an originating station in a data communication system, only the acoustical coupling system for the terminating station will be described. The acoustical coupling system for the originating station is similar to the acoustical coupling system for the terminating station and corresponding parts have been given the same reference numerals. At the terminating station, data communication equipment 10 is shown enclosed in dashed lines. This data communication equipment 10 is known in the art, and includes transmitting equipment which obtains or reads stored information and produces an electrical signal indicative of this information. The data communication system 10 may also be a telegraph or teletype arrangement. This electrical signal to provided at the transmitted information terminal. The data communication equipment 10 includes equipment for receiving information signals and converting these signals to the proper form for reproducing or utilizing the information at a distant station. The data communication equipment 10 includes a terminal to which a signal is applied that indicates that the data communication equipment may transmit information. The data communication equipment 10 includes a terminal which produces a signal that indicates that the equipment 10 has been turned on. The equipment 10 as described is known in the art, and may operate on various signal levels, depending upon the particular type of equipment selected. The equipment 10 is coupled through my acoustical coupling system to a terminating station handset which may be an ordinary telephone handset. The handset may be used by a customer or user to establish a long distance circuit over a telephone link to a distant station, after which the handset is placed on an acoustic coupler 11 and hand switch 12. The acoustic coupler 11 includes a microphone or similar device which responds to signals in the handset earpiece, and a loudspeaker or similar device which provides acoustic signals to the handset mouthpiece. The microphone and loudspeaker are connected or wired to movable switch elements S6 and S8 respectively. These switch elements S6 and S8 are portions of a ganged switch S having ten such elements, each element being indicated by the letter S followed by its respective reference numeral. The elements S1 through S10 are ganged together so that they are operated by a single control, as indicated by the dashed lines. Each of the elements S1 through S10 has an associated set of contacts 0 and T. The elements S1 through S10 are either connected to the respective 0 contacts when the acoustical coupling system is used as an originating station, or are connected to the T contacts when the acoustical coupling system is used as a terminating station. In this description, "originating station" is the arbitrary designation for the data communication station which originates a call, and "terminating station" is the arbitrary designation for a data communication station that receives a call.

The acoustical coupling system includes a high frequency band-pass filter 14 which has a characteristic that passes a band of high frequencies $F_H$ and a low frequency band-pass filter 15 which has a characteristic that passes a band of low frequencies $F_L$. These filters 14, 15 are provided to separate the different frequencies which may be used to transmit and receive information, particularly at the same time. In order that my acoustical coupling system can operate over conventional telephone lines, I have selected a high frequency band between 2,025 cycles and 2,225 cycles for transmitting by a terminating station and receiving by an originating station, and a low frequency band between 1,070 cycles and 1,270 cycles for receiving by a terminating station and transmitting by an originating station. These bands permit my acoustical coupling system to be used with many types of data communication equipment within the frequency band of an ordinary telephone long distance circuit. Frequency shift keying operation is used. When a terminating station is transmitting, it transmits mark signals at a frequency of 2,225 cycles, and space signals at a frequency of 2,025 cycles. When an originating station is transmitting, it transmits mark signals at a frequency of 1,270 cycles and space signals at a frequency of 1,070 cycles. However, other bands or specific frequencies may be utilized in accordance with my invention. The filters 14, 15 are coupled to sending or receiving portions of my system by appropriate positioning of the switch elements S5, S6, S7, S8. In FIG. 1*a*, the low frequency band-pass filter 15 is shown connected to the handset earpiece and to the receiving equipment of my system. The transmitting equipment of my system is connected directly to the handset mouthpiece, since I have found that filtering is not needed at this point. However, at the originating station in FIG. 1*c*, the low frequency band-pass filter 15 is connected between the handset mouthpiece and the transmitting equipment, and the high frequency band-pass filter 14 is connected between the handset earpiece and the receiving equipment.

With reference to FIG. 1*a* again, the switch element S5 is connected through an amplifier 16 to a demodulator 17 which is a detector for frequency shift keying signals or frequency modulated signals. The demodulator 17 is provided with a switch element S4 to select appropriate operating parameters or circuit elements for the demodulator 17, depending on whether the demodulator 17 is used at an originating station or a terminating station. The output of the demodulator 17 is applied to a level decoder 18 which also has a switch element S3 to select proper operating parameters or circuit elements. The level decoder 18 is provided to transform the demodulated signal to the proper voltage level or magnitude for the particular type of equipment being used. The output of the level decoder 18 is applied to a three input AND gate G1, the output of which is applied to a buffer driver circuit 19 which provides appropriate receive signals for the data communication equipment 10.

The output of the amplifier 16 is also applied to a carrier detector 20 which is an ordinary envelope detector that produces an enabling signal in response to a signal in either band of 1,070 to 1,270 cycles or 2,025 or 2,225 cycles. The carrier detector 20 can produce the enabling signal when supplied with an appropriate frequency signal and when enabled by a positive voltage provided by the handset position switch 12. Normally, the switch 12 supplies a negative voltage −V as indicated, but when the handset is placed on the acoustic coupler 11 and on the switch 12, a contact is operated so that a positive voltage +V is provided. The enabling signal from the carrier detector 20 is applied to a time delay circuit 21 having a time delay of 150 milliseconds. The output of this time delay circuit 21 is applied to one input of the AND gate G1 and also to the switch element S2 and the T contact of the switch element S1. The switch element S1 is connected on one input of an AND gate G2, and the output of this gate G2 is applied to a time delay circuit 24 having a selected time delay of 200 milliseconds. The output of the time delay circuit 24 is applied to a buffer amplifier or driver 25, and the output of this buffer 25 produces or provides a clear to transmit signal for the data communication equipment 10. The other input of the AND gate G2 is connected to the handset position switch 12.

Information transmitted by the data communication equipment 10 is applied to one input of an AND gate G3. The other input of this AND gate G3 is connected to the output of the time delay circuit 24. The output of the AND gate G3 is applied to a level encoder 27 which converts the level in the data communication equipment 10 to an appropriate magnitude or value for application to a modulator 28. The modulator 28 converts this signal to an appropriate frequency for transmission, depending upon whether the acoustical coupling system is used at a terminating station or at an originating station. The level encoder 27 and the modulator 28 have associated switch elements S9 and S10 for providing appropriate operating parameters or circuit elements. The output of the modulator 28 is connected to the switch element S7.

The modulator 28 is rendered operative or is permitted to transmit signals when provided with an enabling signal from a time delay circuit 30 having a time delay of 1,500 milliseconds. The input of the time delay circuit 30 is coupled to the output of a three input AND gate G4. One input of the AND gate G4 is connected to the 0 contact of the switch element S2, the second input is connected to the data communication equipment on signal terminal, and the third input is connected to the handset position switch 12.

Figure 2:
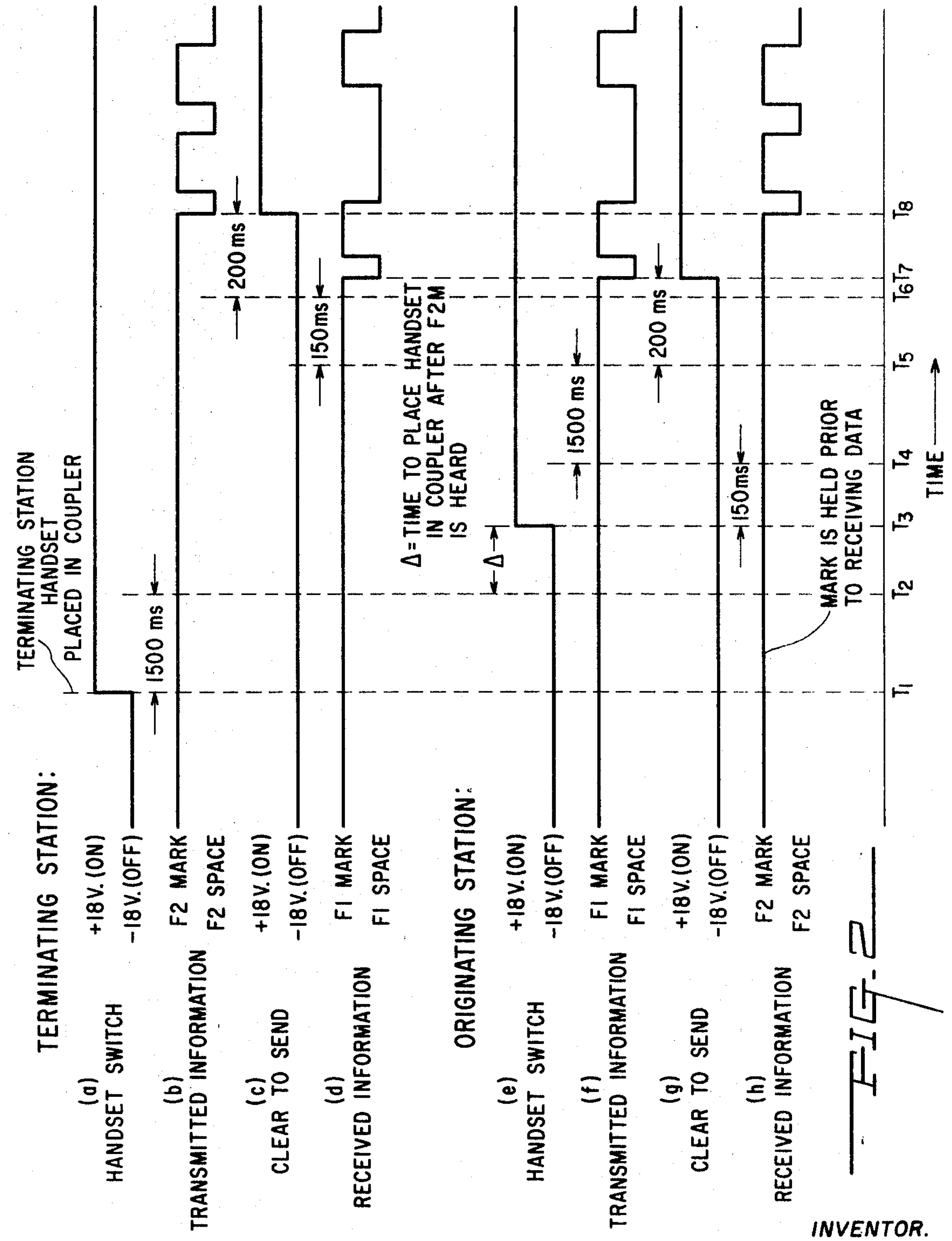
FIG. 2 shows waveforms illustrating the operation of my invention.

The operation of my acoustical coupling system will be explained in connection with the wave forms shown in FIG. 2. These wave forms are plotted along a common time axis. When my acoustical coupling system is used, a party at the originating station may place a conventional long distance telephone call to a distant terminating station. After establishing communication, the parties will usually turn their respective data communication equipments 10 on, and position their switch elements to the terminals 0 and T respectively. FIG. 1*a* shows the terminating station with the switch elements S1 through S10 connected to the terminating terminals T, and FIG. 1*c* shows the originating station with the switch elements S1 through S10 connected to the originating contacts 0. However, the switch elements could be reversed at each station if desired. It is only necessary that the two stations have their switch elements S1 through S10 connected to different contacts so that the proper frequencies are transmitted and received. Then, the party at the terminating station places his handset on the acoustic coupler 11 and handset switch 12. This is shown in the waveform 2*a* at the time T1. This changes the voltage on the handset position switch 12 from a voltage of −V to a voltage of +V which has been assumed to be 18 volts. At this point, the gate G4 at the terminating station thus has the necessary voltages at its three inputs to produce an output which is applied to the time delay circuit 30. After a delay of 1,500 milliseconds to allow the circuits to become stabilized, the modulator 28 at the terminating station is enabled at the time T2. When this signal at the time T2 is applied to the terminating station modulator 28, a signal is transmitted by the terminating station. The gate G3 at the terminating station has one input connected to the transmitted information terminal (which is in the mark condition), and the other input connected to the time delay circuit 24 so that a signal is transmitted. In the assumed example, this signal has a frequency of 2,225 cycles. This signal is applied to the terminating station handset mouthpiece, and is transmitted over the telephone link to the originating station. When the party at the originating station hears this signal, he then knows that the terminating station handset is in proper position. After an appropriate time Delta (Δ) which is at the time T3, the party at the originating station places his handset on the acoustic coupler 11 and the handset switch 12. This is indicated by the waveform 2*e* at the time T3. At this time T3, the handset switch 12 provides a positive voltage to the originating station coupling system.

After the party at the originating station places his handset on the acoustic coupler 11 and handset switch 12, the signal in his handset earpiece is then applied to the switch element S6 and the high frequency band-pass filter 14. This signal is applied to the carrier detector 20 which supplies a detected signal to the time delay circuit 21. After a delay of 150 milliseconds to allow the telephone link echo suppressors to operate, the time delay circuit 21 applies a signal at the time T4 through the switch element S2 to the gate G4. This enables the gate G4 so that after 1,500 milliseconds, which is at the time T5, an enabling signal is applied to the modulator 28 at the originating station. The modulator 28 may then transmit a mark signal which in the assumed example is 1,270 cycles, to the low frequency band-pass filter 15 and the handset mouthpiece at the originating station. This signal is transmitted over the telephone link to the handset earpiece at the terminating station where it is connected to the carrier detector 20. At the terminating station, after a delay of 150 milliseconds, which is at the time T6, the time delay circuit 21 produces an enabling signal which makes the gates G1 and G2 permissive. Approximately 50 milliseconds later (or 200 milliseconds after the time t5), which is at the time T7, the time delay circuit 24 at the originating station provides a clear to send signal (FIG. 2*g*) to the data communication equipment 10 at the originating station so that the originating station begins to transmit information. The time delay of 200 milliseconds at the originating station gives 50 milliseconds of added time beyond the time delay of 150 milliseconds at the terminating station so that the data communication equipment 10 at the terminating station will be ready to receive information. The information transmitted by the originating station is shown in FIG. 2*f* and the information received by the terminating station is shown in FIG. 2*d*.

At the terminating station, the signal provided by the time delay circuit 21 is also applied to the time delay circuit 24. Two hundred milliseconds after application of this signal (that is, 200 milliseconds after the time T6), a clear to send signal (FIG. 2*c*) is provided to the data communication equipment 10 at the terminating station that permits the equipment 10 to begin transmitting. The information transmitted by the terminating station is shown in FIG. 2*b* at the time T8, and the information received by the originating station is shown in FIG. 2*h*. After the information is transmitted, the handsets may be removed from the couplers 11 and conversation resumed, or the long distance connection terminated.

It will thus be seen that my acoustical coupling system provides coupling between data communication equipment and an ordinary telephone handset, and provides appropriate circuit elements for converting received frequencies to appropriate voltages for the data communication equipment, or converts voltages from the data communication equipment to appropriate frequencies for transmission. My acoustical coupling system also provides appropriate time delays in order to permit circuits to be established in both directions in an orderly and stable fashion, and to permit appropriate echo suppressors and other telephone line equipment to operate and function. If, when a circuit is being established between two stations, the originating station party places his handset on the coupler 11 and switch 12 before the terminating station party does so, nothing will happen since the marking signal from the terminating station is not produced. But once the terminating station party places his handset on the coupler 11 and switch 12, then the coupling system functions as described beginning at the time T1. The time Δ is, of course, reduced to zero if the originating handset is in place on the coupler 11 and switch 12.

Figure 3:
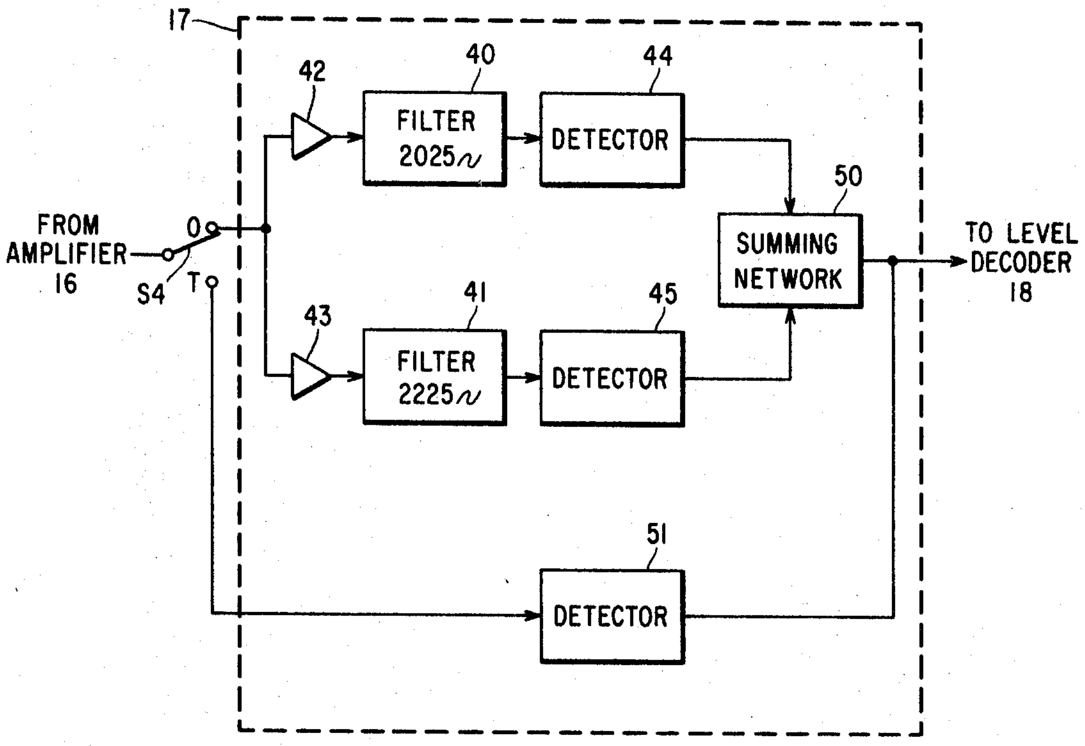
FIG. 3 shows a more detailed electrical diagram of a portion of the embodiment of FIGS. 1*a*, 1*b*, and 1*c*.
Figure 4:
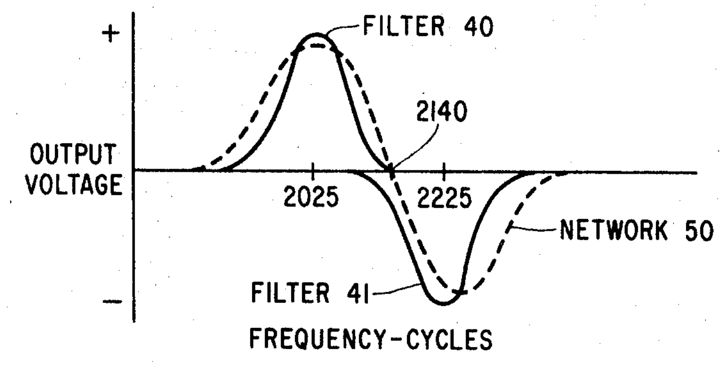
FIG. 4 shows wave forms illustrating the operation of the portion of my invention shown in FIG. 3.

Persons skilled in the art will realize, an ordinary telephone handset has some acoustical or electrical feedback between its mouthpiece and earpiece in order that a person using the handset may hear his own voice. From a voice communication standpoint, this feedback is desirable. However, this feedback may cause improper data operation where a low frequency is transmitted from a given location and a high frequency is received at the given location. Thus, in the example explained above, the originating station transmits on frequencies of 1,070 and 1,270 cycles, and receives on frequencies of 2,025 and 2,225 cycles. The second harmonics of these transmitted frequencies are 2,140 and 2,540 respectively, and it will be seen that this frequency of 2,140 cycles lies in the receive band between 2,025 and 2,225 cycles. In order to prevent this second harmonic frequency from interferring with reception, I have provided an improved demodulator circuit for use at a station when that station transmits on a low frequency whose higher harmonics may interfere with received high frequencies. This improved circuit is provided in the demodulator, and is shown in more detail in FIG. 3. Assuming that the originating station receives on frequencies of 2,025 and 2,225, I provide two filters 40, 41 which have a passband characteristic centered on the frequencies of 2,025 and 2,225 respectively. The individual responses of the filters 40, 41 are shown in FIG. 4. FIG. 4 also shows the voltage output of a summing network 50 with respect to frequency. This output voltage can be obtained by matching the two filters 40, 41 so that a null or zero output is obtained at the frequency of 2,140 cycles which is the second harmonic of the transmitted signal of 1,070 cycles. The filters 40, 41 are provided with respective amplifiers 42, 43 which are connected to the 0 contact of the switch element S4. The filter outputs are applied to respective detectors 44, 45 and the outputs of the detectors 44, 45 are applied to a summing network 50. The output of the summing network 50 is applied to the level decoder 18. Where the acoustical coupling system is used in a terminating station, the switch element S4 connects its input to a single detector 51, since separate filters and detectors are not needed where, as at a terminating station, the received frequency is lower than the transmitted frequency.

It will thus be seen that my invention provides a new and improved acoustical coupling system for data communication equipment. My acoustical coupling system provides the necessary signal magnitude and frequency changes, and also provides the necessary time delays. Further, my system provides improved operation because it reduces the feedback between a telephone handset mouthpiece and earpiece, particularly where a transmitted frequency is lower than a received frequency. While my invention has been described in connection with one embodiment, persons skilled in the art will appreciate that modifications may be made. For example, at the terminating station, the high frequency band-pass filter 14 may actually be connected into the circuit between the switch elements S7 and S8 for transmission, although this is not necessary. Likewise, other values for the various time delays may be selected. The telephone link may, of course, include any type of communication circuit that can carry the various signals. And finally, the various encoders and decoders may have different signal inputs and outputs. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A system for coupling data communication equipment having an input for receiving information and an output for sending information to a telephone handset having an earpiece and a mouthpiece, comprising:

a. system input means adapted to be connected to a data communication information output and system output means adapted to be connected to a data communication information input;

b. means for providing an acoustical input coupling from a telephone handset earpiece and means for providing an acoustical output coupling to a telephone handset mouthpiece;

c. a demodulator having an input connected to said acoustical input coupling means and an output connected to said system output;

d. first time delay means;

e. first gating means, connected to said demodulator and having an input adapted to be operated in response to a telephone handset being positioned on said acoustical coupling means, for rendering said demodulator operative, said first gating means having a second input, said first time delay means connected to said second input for operating said second input in response to a signal at said acoustical input coupling means;

f. a modulator having an input connected to said system input and an output connected to said acoustical output coupling means;

g. and second gating means, connected to said modulator and having an input adapted to be operated in response to a telephone handset being positioned on said acoustical coupling means, for rendering said modulator operative.

2. The system of claim 1 further comprising second time delay means connected between said second gating means and said modulator.

3. The system of claim 2 wherein said demodulator includes means for suppressing harmonic frequencies which represent information sent by the data communication equipment and which are in the vicinity of frequencies which represent information received by the data communication equipment.